United States Patent
Glatzel

[11] 3,864,026
[45] Feb. 4, 1975

[54] WIDE ANGLE PHOTOGRAPHIC LENS

[75] Inventor: Erhard Glatzel, Heidenheim, Germany

[73] Assignee: Carl Zeiss Stiftung (a.k.a. Carl Ziess), Heidenheim on the Brenz, Wurttemberg, Germany

[22] Filed: Sept. 19, 1973

[21] Appl. No.: 398,774

[30]  Foreign Application Priority Data
Sept. 21, 1972 Switzerland............... 13917/72

[52] U.S. Cl. ............................. 350/214, 350/176
[51] Int. Cl. ...................... G02b 9/00, G02b 1/00
[58] Field of Search ......................... 350/214, 176

[56] References Cited
UNITED STATES PATENTS
3,549,241  12/1970  Mori ............................. 350/214 X
3,622,227  11/1971  Shimizu ........................... 350/214
3,663,095  5/1972  Mori ............................... 350/214
3,736,049  5/1973  Shimizu ........................... 350/214

*Primary Examiner*—Paul A. Sacher
*Attorney, Agent, or Firm*—Stonebraker & Shepard

[57] ABSTRACT

A wide angle photographic lens or objective, having a rear member (behind the central vertex distance or space) and a front member, the front member being composed of three or more groups or assemblies. Five specific examples are disclosed, falling into three general configurations. Various limits are stated for the relationship of the various lens elements or groups of elements to each other, and if these limits are followed in designing the lens, an objective of excellent quality and wide angular field of view can be obtained.

13 Claims, 3 Drawing Figures

WIDE ANGLE PHOTOGRAPHIC LENS

BACKGROUND OF THE INVENTION

Many photographic objectives or lenses of the "wide angle" type are known in the art. The object of the present invention is to provide a wide angle lens of improved design, having a relative aperture within the range of about $f/3.8$ to $f/2.8$ or more, characterized by a useful field of view with an extremely high picture performance, whose angular diametrical field of view is greater than 85° and can extend up to about 110° or even more.

DESCRIPTION OF THE PREFERRED EMBODIMENTS

As already mentioned, the invention relates to a very wide angle lens giving very high picture performance through an angle of view (diametrical angle) which is greater than 85° and can extend up to about 110° or more. The lens has what may be described as a rear member, behind the diaphragm space or central aperture space indicated in the drawings at CS, and what may be described as a front member forwardly of such diaphragm space or central vertex space.

In all of the views of the drawings, the rear member is indicated in general by the reference characters Hgl, being an abbreviation for the German word "Hinterglied," and the front member is indicated in general by the reference characters Vgl, an abbreviation for the German word "Vorderglied."

The rear member consists of at least three members or components in air. The construction of the rear member corresponds in general to constructions which have been proposed for the rear members of wide angle lenses in, for example, German Pat. Nos. 1,187,393, and 1,220,164, and 1,250,151, and 1,250,152, and 1,250,153, and others, and in which both the negative element facing the aperture or diaphragm space and one or two of the following converging lenses can, in their turn, be developed as doublets. The rear member of the present lens has, however, the improved specific construction (as compared with the German patents mentioned) disclosed hereafter.

The front member Vgl of the present lens is composed of at least three groups or assemblies which may be conveniently referred to successively, in a direction forwardly from the aperture space or central vertex space CS, as group (a), group (b), etc. The form of lens illustrated in FIG. 1 has only three groups forwardly of the aperture space, and they are respectively indicated in general in FIG. 1 by the reference characters Gr. (a), Gr. (b), and (c). In the construction shown in FIG. 2, there are four groups in the front member, the first three (in a direction forwardly from the aperture space) being indicated in general by the same reference characters just mentioned, and the fourth or front group being indicated in general by the designation Gr. (d). In the construction shown in FIG. 3, there is also a fourth group designated as Gr. (d), but in this instance the group (d) is formed by only a single lens element rather than a plurality of elements, and so is to be regarded as the "equivalent" of a group, and is so designated. However, in the following parts of the specification and the claims, the word "group" is intended to be interpreted broadly enough to cover a single lens element constituting the equivalent of a group of two or more elements.

According to the invention, the above mentioned front member of the lens is constructed in such manner that in each of the individual groups constituting the front member, the group has a negative part or component, preferably of meniscus shape, inserted in front of a positive part or component, in such manner that these two parts enclosed between them a diverging-acting air space or negative air lens, whose more strongly diverging glass-air surface is concave toward the shorter conjugate of the lens system, i.e., toward the image. These air lenses are designated in sequence, from the central vertex space or diaphragm space forwardly, by the characters $\alpha$ and $\beta$ and $\gamma$, in the case of lenses having three groups in the front member, with the further designation of $\delta$ if the lens has four groups in the front member.

Furthermore, according to the invention, the individual parts or components of the front member of the lens are so dimensioned and constructed that they comply with or fulfill simultaneously all of the conditions set forth in the following paragraphs respectively numbered (1) through (4), and also the further condition specified in numbered paragraphs (5) and (6) if the lenses are to be of the character to which those paragraphs apply.

1. The paraxial individual focal length $(f_a)$ of the rearmost group Gr. (a) of the front member is between the limits of 0.75 times and 2.25 times the equivalent focal length ($F$) of the entire lens system.

2. The absolute value of the paraxial focal length $(f_b)$ of the preceding group part Gr. (b) next preceding Gr. (a) is between the limits of 9.0 $F$ and 2.2 $F$.

3. The numerical value of the paraxial focal length $(f_{c, b})$ of the combination of the two groups Gr. (c) and Gr. (b) together has an absolute value between the limits of 2.25 $F$ and 5.65 $F$.

4. In case the lens system has a fourth group in the front member, instead of merely three groups, then the paraxial focal length $(f_d)$ of this fourth group Gr.(d) located in front of the group Gr. (c) is, in its negative value, within the limits of 5.5 $F$ and 8.5 $F$.

5. In case the lens is to have a useful angle of view, with full aperture, which exceeds approximately 90°, then the air lens refractive power ($\phi_\gamma$) as the surface refractive power sum of the two radii of curvature which close the air lens $\gamma$ in the group Gr. (c) is so dimensioned that the negative value of $\phi_\gamma$ is within the limits of 0.25 $\Phi$ and 0.45 $\Phi$, in which $\Phi$ is the equivalent refractive power of the entire lens system, this being $1/F$. In this way the result is obtained that in this group with a large beam cross section prevailing therein, if the upper limit just mentioned is not exceeded, the zone intermediate errors of the wide opened and/or inclined ray beam can not only be definitely avoided but can be kept very unexpectedly small.

6. In case the front member is constructed with a total of four groups rather than merely three, then according to the invention a particularly advantageous picture performance is obtained if the parts are so dimensioned and constructed that the air lens refractive power ($\phi_\gamma$) of the air lens $\delta$ of the front group Gr. ($d$) is, in its negative value, within the limits of 0.1 $\Phi$ and 0.4 $\Phi$, in which $\Phi$ is the equivalent refractive power of the complete lens system, or $1/F$.

The construction of the rear member of the lens has already been mentioned above.

Figure 2:
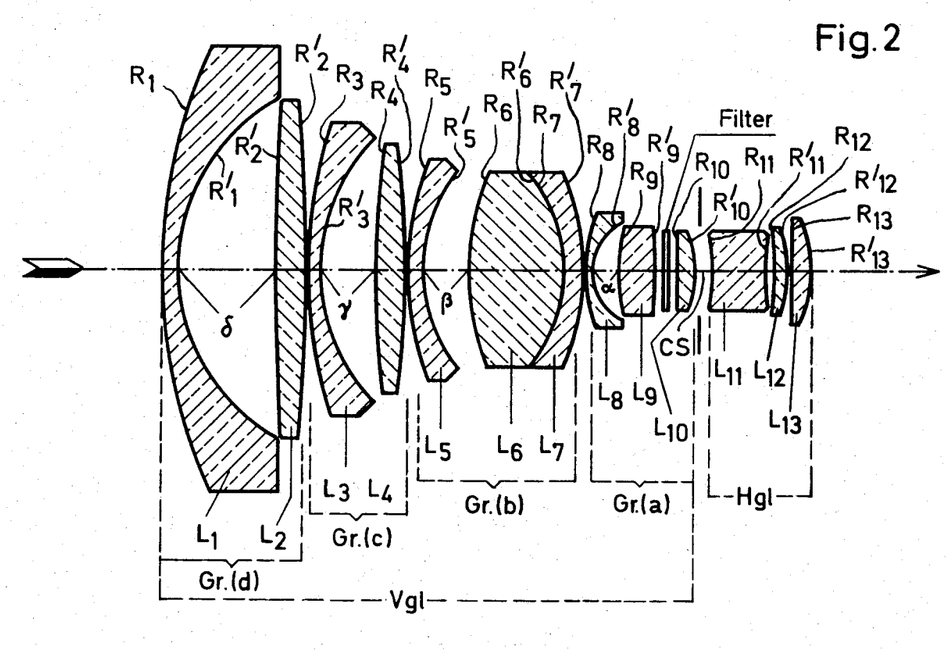
FIG. 2 is a similar lens diagram illustrating a lens in accordance with Example 3 of the following tables.
Figure 3:
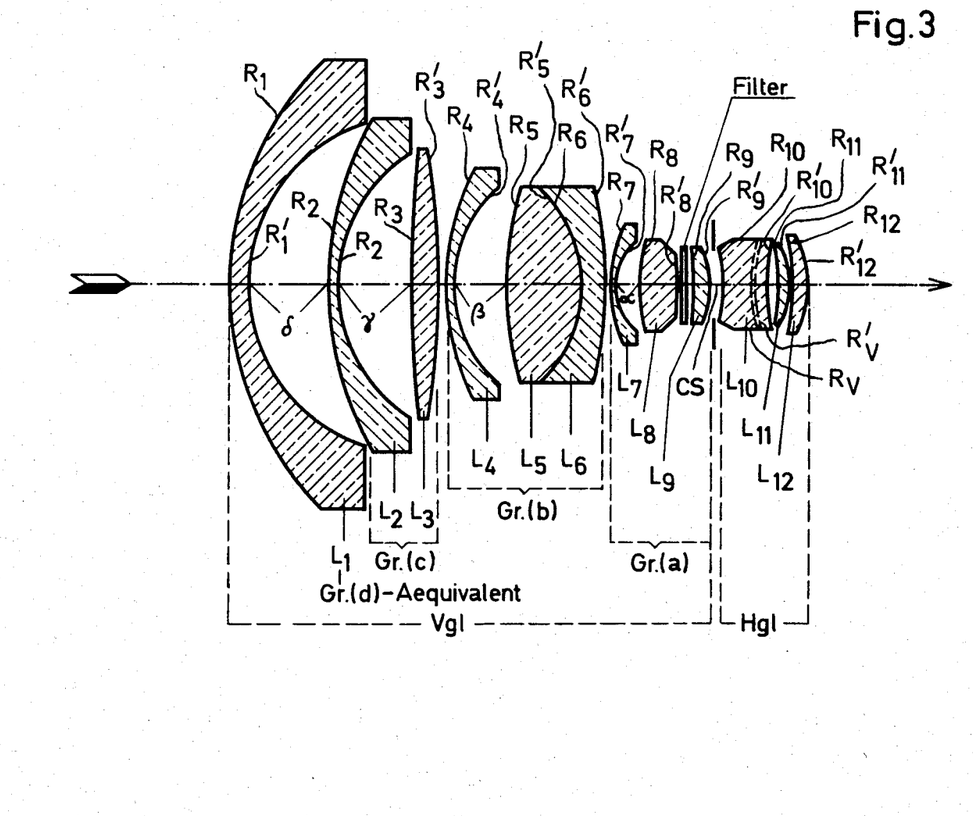
FIG. 3 is a similar lens diagram illustrating a lens in accordance with Examples 4 and 5.

It is another feature of the invention that in the vicinity of the central vertex space or diaphragm space (CS), one of the lenses is split up by a finite inner air spacing, to provide a space in which a filter can be selectively inserted or removed as desired. When a filter is used in such a space, it can be a filter of particularly small diameter, without the mount of the filter causing injurious vegnetting for the strongly inclined lateral beam. Preferably the lens which is split in this way to provide a space for the filter, is the lens forming the positive part of the first group Gr. ($a$) directly in front of the aperture or diaphragm space CS. This is illustrated both in FIG. 2 and in FIG. 3. In FIG. 2, the filter is shown in a space between lens elements $L_9$ and $L_{10}$, which two elements together can be considered as the positive part of the group Gr. ($a$). In FIG. 3, the filter is shown in a space between the lens elements $L_8$ and $L_9$, which two elements together can be considered as constituting the positive part of the group Gr. ($a$).

In those lenses of the present invention where the angle of view is greater than 100°, it has proven particularly advantageous to bring the front group Gr. ($d$) as close as possible to the next group Gr. ($c$) behind it, so that the front opening of the lens, and thus its front diameter, within the scope of a pre-established avoidance of vignetting, makes it possible to obtain the smallest possible dimensioning. This is accomplished, according to the invention, by the fact that the positive refractive power of the converging component behind the front air lens $\delta$ in the front group Gr. ($d$) is distributed over the lens surfaces of the front lens. As a result of this, the positive partial lens itself can be dispensed with. In this way the negative-acting front meniscus, as illustrated at $L_1$ in FIG. 3, becomes the equivalent of the front group components $L_1$ and $L_2$ illustrated in FIG. 2, and the front meniscus $L_1$ can be positioned directly against the front negative meniscus $L_2$ of the next group Gr. ($c$), so that there is a minimum spacing, as illustrated in FIG. 3.

In the accompanying drawings, the lenses in accordance with the present invention are illustrated diagrammatically or schematically, using reference characters which have been referred to above in this text, or which will be mentioned below or will be readily understood by those skilled in this art. As usual in conventional lens diagrams, the light is assumed to travel from left to right, the individual lens elements are designated by the letter L with a subscript indicating the number of the lens as numbered consecutively from left to right, and the radius of curvature of the front face (left face) of each lens element is indicated by the letter R with a subscript corresponding to the consecutive number of the particular lens element, while the radius of the rear face (right hand face) of the each lens element is indicated by R' with a subscript corresponding to the consecutive number of the element. In the tables, plus signs with respect to radii indicate surfaces which are convex toward the incident light, and minus signs indicate surfaces concave toward the incident light (that is, convex toward the rear). The tables also show the axial thicknesses of the individual lens elements, indicated by T with a subscript corresponding to the consecutive number of the individual lens element, and the axial spacings between lens elements, indicated by S with a subscript corresponding to the number of the space as numbered consecutively from front to rear. Zero spacing indicates lens elements cemented to each other. All spacings greater than zero refer to air spacings.

Also, in the tables, the index of refraction of the glass used for each lens element is given in the column headed N, and this refers to the yellow $d$-line of the helium spectrum whose wavelength if 5,876 Angstrom units. The refractive index based on this line is shown in many commercial catalogues of manufacturers of optical glasses. The Abbe number or index of dispersion of the glass used for each lens element is given in the table in the column headed V.

All linear dimensions are given with reference to the equivalent focal length which is regarded as unity, that is, $F = 1.0000$. The various tables also give, with respect to each example, the intended relative aperture, and the useful total angle of view indicated by $2w_o$, and the back focus or back focal length, indicated by $s'$, with reference to a remote object at infinity. The rather long image-side focus or back focus of the new lenses of the present invention, provides a large free axial spacing between the last surface of the lens system and the image plane, thus making these new lenses suitable for use with a pivoted mirror reflex camera, where sufficient space is needed between the rear surface of the lens system and the image plane for operation of the pivoted mirror. In wide angle lenses of very short focal length it has often been difficult to provide sufficient space for a pivoted mirror, but this difficulty is overcome by the lens construction according to the present invention.

Figure 1:
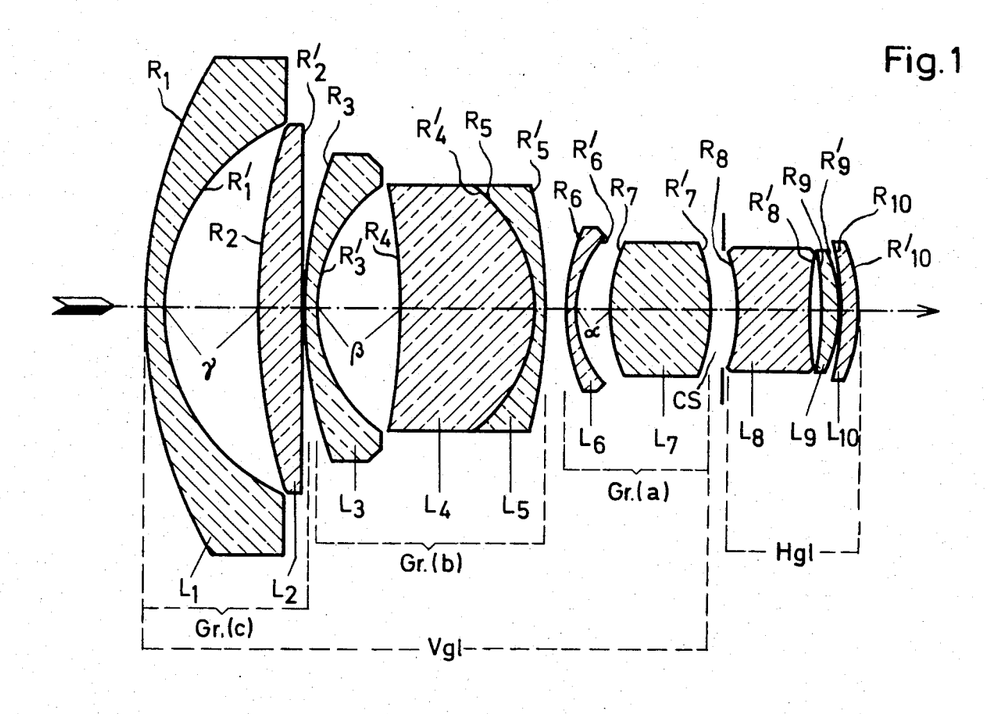
FIG. 1 is a lens diagram illustrating a lens according to Examples 1 and 2 of the following tables.

Table 1 and Table 2 gives specific data for Example 1 and Example 2, which are lenses or objectives according to the general configuration illustrated in FIG. 1 of the drawings. Table 3 gives specific data for Example 3, an objective of the general configuration illustrated in FIG. 2 of the drawings. Table 4 and Table 5 give specific data for Examples 4 and 5, constituting lens systems or objectives of the general configuration illustrated in FIG. 3 of the drawings.

Table I (Example 1)

$F = 1.000$    f/3.8    $2w_o = 88°$    $S'' = 1.928\ F$

| Lens | Radii | | Thicknesses and Spacings | | N | V |
|---|---|---|---|---|---|---|
| $L_1$ | $R_1$ | $= +2.249$ | $T_1$ | $= 0.105$ | 1.691 | 54.7 |
|  | $R'_1$ | $= +1.127$ | $S_1$ | $= 0.399$ |  |  |
|  | $R_2$ | $= +2.382$ |  |  |  |  |

Table I — Continued (Example 1)

F = 1.000    f/3.8    $2w_o = 88°$    $S'' = 1.928\ F$

| Lens | Radii | | Thicknesses and Spacings | | N | V |
|---|---|---|---|---|---|---|
| $L_2$ | $R'_2$ | = +16.50 | $T_2$ | = 0.263 | 1.717 | 29.5 |
| | $R_3$ | = +1.536 | $S_2$ | = 0.005 | | |
| $L_3$ | $R'_3$ | = +0.706 | $T_3$ | = 0.060 | 1.713 | 53.8 |
| | $R_4$ | = −5.772 | $S_3$ | = 0.362 | | |
| $L_4$ | $R'_4$ | = −0.864 | $T_4$ | = 0.574 | 1.669 | 45.0 |
| | $R_5$ | = −0.864 | $S_4$ | = 0 | | |
| $L_5$ | $R'_5$ | = −1.662 | $T_5$ | = 0.126 | 1.805 | 25.4 |
| | $R_6$ | = +1.409 | $S_5$ | = 0.007 | | |
| $L_6$ | $R'_6$ | = +0.462 | $T_6$ | = 0.059 | 1.713 | 53.8 |
| | $R_7$ | = +0.743 | $S_6$ | = 0.077 | | |
| $L_7$ | $R'_7$ | = −0.716 | $T_7$ | = 0.589 | 1.622 | 36.0 |
| | $R_8$ | = −0.815 | $S_7$ | = CS = 0.148 | | |
| $L_8$ | $R'_8$ | = +2.635 | $T_8$ | = 0.144 | 1.805 | 25.4 |
| | $R_9$ | = −1.482 | $S_8$ | = 0.059 | | |
| $L_9$ | $R'_9$ | = −0.545 | $T_9$ | = 0.134 | 1.504 | 67.0 |
| | $R_{10}$ | = −3.803 | $S_9$ | = 0.003 | | |
| $L_{10}$ | $R'_{10}$ | = −1.064 | $T_{10}$ | = 0.107 | 1.603 | 60.5 |

Table 2

(Example 2)

F = 1.000    f/2.8    $2w_o = 98°$    $s' = 1.862\ F$

| Lens | Radii | | Thicknesses and Spacings | | N | V |
|---|---|---|---|---|---|---|
| $L_1$ | $R_1$ | = +2.7549 | $T_1$ | = 0.1224 | 1.6910 | 54.71 |
| | $R'_1$ | = +1.1710 | $S_1$ | = 0.5516 | | |
| $L_2$ | $R_2$ | = +3.5320 | $T_2$ | = 0.2765 | 1.8052 | 25.43 |
| | $R'_2$ | = −317.02 | $S_2$ | = 0.0030 | | |
| $L_3$ | $R_3$ | = +2.4620 | $T_3$ | = 0.0744 | 1.7130 | 53.85 |
| | $R'_3$ | = +0.8898 | $S_3$ | = 0.4677 | | |
| $L_4$ | $R_4$ | = −5.0772 | $T_4$ | = 0.8062 | 1.7130 | 53.85 |
| | $R'_4$ | = −0.8937 | $S_4$ | = 0 | | |
| $L_5$ | $R_5$ | = −0.8937 | $T_5$ | = 0.0656 | 1.5731 | 42.58 |
| | $R'_5$ | = −2.9405 | $S_5$ | = 0.1064 | | |
| $L_6$ | $R_6$ | = +1.0377 | $T_6$ | = 0.0546 | 1.6910 | 54.71 |
| | $R'_6$ | = +0.6213 | $S_6$ | = 0.2085 | | |
| $L_7$ | $R_7$ | = +0.9028 | $T_7$ | = 0.6039 | 1.5481 | 45.75 |
| | $R'_7$ | = −1.0353 | $S_7$ | = CS = 0.1531 | | |
| $L_8$ | $R_8$ | 38 −1.0857 | $T_8$ | = 0.4305 | 1.7847 | 26.08 |
| | $R'_8$ | = +3.6924 | $S_8$ | = 0.0591 | | |
| $L_9$ | $R_9$ | = −2.2744 | $T_9$ | = 0.1046 | 1.5038 | 66.99 |
| | $R'_9$ | =]−0.8466 | $S_9$ | = 0.0027 | | |
| $L_{10}$ | $R_{10}$ | = −2.6585 | $T_{10}$ | = 0.1112 | 1.6127 | 58.58 |
| | $R'_{10}$ | = −1.0537 | | | | |

Table 3

(Example 3)
F = 1.000, f/3.5, $2w_o = 100°$, $s' = 2.351 F$

| Lens | Radii | | Thicknesses and Spacings | | N | V |
|---|---|---|---|---|---|---|
| $L_1$ | $R_1$ | = +4.713 | $T_1$ | = 0.160 | 1.623 | 58.1 |
|  | $R'_1$ | = +1.794 | $S_1$ | = 0.948 |  |  |
| $L_2$ | $R_2$ | = +22.89 | $T_2$ | = 0.345 | 1.623 | 58.1 |
|  | $R'_2$ | = −18.05 | $S_2$ | = 0.006 |  |  |
| $L_3$ | $R_3$ | = +4.793 | $T_3$ | = 0.130 | 1.691 | 54.7 |
|  | $R'_3$ | = +1.822 | $S_3$ | = 0.545 |  |  |
| $L_4$ | $R_4$ | = +11.46 | $T_4$ | = 0.321 | 1.785 | 26.1 |
|  | $R'_4$ | = −14.25 | $S_4$ | = 0.003 |  |  |
| $L_5$ | $R_5$ | = +2.823 | $T_5$ | = 0.123 | 1.713 | 53.9 |
|  | $R'_5$ | = +1.378 | $S_5$ | = 0.462 |  |  |
| $L_6$ | $R_6$ | = +2.172 | $T_6$ | = 0.922 | 1.713 | 53.9 |
|  | $R'_6$ | = −1.586 | $S_6$ | = 0 |  |  |
| $L_7$ | $R_7$ | = −1.586 | $T_7$ | = 0.215 | 1.564 | 43.8 |
|  | $R'_7$ | = −3.060 | $S_7$ | = 0.003 |  |  |
| $L_8$ | $R_8$ | = +1.675 | $T_8$ | = 0.051 | 1.788 | 47.4 |
|  | $R'_8$ | = +0.504 | $S_8$ | = 0.227 |  |  |
| $L_9$ | $R_9$ | = +1.696 | $T_9$ | = 0.379 | 1.785 | 26.1 |
|  | $R'_9$ | = −7.290 | $S_9$ | = 0.056 |  |  |
|  |  | Plane | $T_{10}$ | = 0.052 Filter | 1.522 | 59.5 |
|  |  | Plane | $S_{10}$ | = 0.054 |  |  |
| $L_{10}$ | $R_{10}$ | = −8.173 | $T_{11}$ | = 0.184 | 1.465 | 65.7 |
|  | $R'_{10}$ | = −0.707 | $S_{11}$ | = CS = 0.112 |  |  |
| $L_{11}$ | $R_{11}$ | = −1.383 | $T_{12}$ | = 0.513 | 1.785 | 26.1 |
|  | $R'_{11}$ | = +2.378 | $S_{12}$ | = 0.072 |  |  |
| $L_{12}$ | $R_{12}$ | = −2.685 | $T_{13}$ | = 0.158 | 1.465 | 65.7 |
|  | $R'_{12}$ | = −0.835 | $S_{13}$ | = 0.004 |  |  |
| $L_{13}$ | $R_{13}$ | = +22.61 | $T_{14}$ | = 0.178 | 1.465 | 65.7 |
|  | $R'_{13}$ | = −1.303 |  |  |  |  |

Table 4

(Example 4)
F = 1.000, f/3.5, $2w_o = 110°$, $s' = 2.334 F$

| Lens | Radii | | Thicknesses and Spacings | | N | V |
|---|---|---|---|---|---|---|
| $L_1$ | $R_1$ | = +3.222 | $T_1$ | = 0.188 | 1.623 | 58.1 |
|  | $R'_1$ | = +1.723 | $S_1$ | = 0.788 |  |  |
| $L_2$ | $R_2$ | = +3.316 | $T_2$ | = 0.122 | 1.691 | 54.7 |
|  | $R'_2$ | = +1.592 | $S_2$ | = 0.706 |  |  |
| $L_3$ | $R_3$ | = +12.37 | $T_3$ | = 0.311 | 1.785 | 26.1 |
|  | $R'_3$ | = −10.26 | $S_3$ | = 0.061 |  |  |
| $L_4$ | $R_4$ | = +2.505 | $T_4$ | = 0.093 | 1.713 | 53.9 |
|  | $R'_4$ | = +1.320 | $S_4$ | = 0.502 |  |  |
| $L_5$ | $R_5$ | = +3.437 | $T_5$ | = 0.751 | 1.713 | 53.9 |
|  | $R'_5$ | = −1.320 | $S_5$ | = 0 |  |  |
|  | $R_6$ | = −1.320 |  |  |  |  |

Table 4 —Continued (Example 4)

F = 1.000    f/3.5    $2w_e = 110°$    s' = 2.334 F

| Lens | Radii | | Thicknesses and Spacings | | N | V |
|---|---|---|---|---|---|---|
| $L_6$ | | | | | | |
| | $R'_6$ | = −3.998 | $T_6$ | = 0.263 | 1.548 | 45.8 |
| | | | $S_6$ | = 0.007 | | |
| $L_7$ | $R_7$ | = +1.349 | $T_7$ | = 0.047 | 1.788 | 47.4 |
| | $R'_7$ | = 0.507 | | | | |
| | | | $S_7$ | = 0.231 | | |
| $L_8$ | $R_8$ | = +1.760 | $T_8$ | = 0.383 | 1.785 | 26.1 |
| | $R'_8$ | = −6.958 | | | | |
| | | | $S_8$ | = 0.056 | | |
| | | plane | $T_9$ | = 0.052 filter | 1.522 | 59.5 |
| | | plane | | | | |
| | | | $S_9$ | = 0.043 | | |
| | $R_9$ | = −16.74 | $T_{10}$ | = 0.176 | 1.465 | 65.7 |
| $L_9$ | $R'_9$ | = −0.706 | | | | |
| | | | $S_{10}$ | = CS = 0.115 | | |
| | $R_{10}$ | = −1.339 | $T_{11}$ | = 0.469 | 1.785 | 26.1 |
| | $R_V$ | = +2.469 | | | | |
| $L_{10}$ | | | $S_{11}$ | = 0 | | |
| | $R'_V$ | = +2.469 | $T_{12}$ | = 0.001 | 1.510 | 59.0 |
| | $R'_{10}$ | = +2.701 | | | | |
| | | | $S_{12}$ | = 0.068 | | |
| | $R_{11}$ | = −3.487 | $T_{13}$ | = 0.142 | 1.465 | 65.7 |
| $L_{11}$ | $R'_{11}$ | = −0.870 | | | | |
| | | | $S_{13}$ | = 0.003 | | |
| $L_{12}$ | $R_{12}$ | = −4.205 | $T_{14}$ | = 0.165 | 1.465 | 65.7 |
| | $R'_{12}$ | = −1.049 | | | | |

Lens $L_1$ is the equivalent of the group Gt.(d). The negative component $L_{10}$ is developed as a doublet and its mating composite surfaces are designated as $R_V$ and $R'_V$.

Table 5

(Example 5)

F = 1.000    f/3.5    $2w_e = 110°$    s' = 2.357 F

| Lens | Radii | | Thicknesses and Spacings | | N | V |
|---|---|---|---|---|---|---|
| $L_1$ | $R_1$ | = +3.472 | $T_1$ | = 0.205 | 1.623 | 58.1 |
| | $R'_1$ | = +1.778 | | | | |
| | | | $S_1$ | = 0.932 | | |
| $L_2$ | $R_2$ | = +4.039 | $T_2$ | = 0.139 | 1.691 | 54.7 |
| | $R'_2$ | = +1.804 | | | | |
| | | | $S_2$ | = 0.656 | | |
| $L_3$ | $R_3$ | = +10.15 | $T_3$ | = 0.342 | 1.785 | 26.1 |
| | $R'_3$ | = −9.043 | | | | |
| | | | $S_3$ | = 0.008 | | |
| $L_4$ | $R_4$ | = +2.859 | $T_4$ | = 0.168 | 1.713 | 53.9 |
| | $R'_4$ | = +1.277 | | | | |
| | | | $S_4$ | = 0.457 | | |
| $L_5$ | $R_5$ | = +2.423 | $T_5$ | = 0.915 | 1.713 | 53.9 |
| | $R'_5$ | = −1.324 | | | | |
| | | | $S_5$ | = 0 | | |
| $L_6$ | $R_6$ | = −1.324 | $T_6$ | = 0.223 | 1.564 | 43.8 |
| | $R'_6$ | = −3.813 | | | | |
| | | | $S_6$ | = 0.004 | | |
| $L_7$ | $R_7$ | = +1.740 | $T_7$ | = 0.048 | 1.788 | 47.4 |
| | $R'_7$ | = +0.501 | | | | |
| | | | $S_7$ | = 0.223 | | |
| $L_8$ | $R_8$ | = +1.715 | $T_8$ | = 0.368 | 1.785 | 26.1 |
| | $R'_8$ | = −8.660 | | | | |
| | | | $S_8$ | = 0.049 | | |
| | | plane | $T_9$ | = 0.053 filter | 1.522 | 59.5 |
| | | plane | | | | |
| | | | $S_9$ | = 0.047 | | |
| | $R_9$ | = −58.72 | | | | |

Table 5—Continued (Example 5)

F = 1.000  f/3.5  $2w_o = 110°$  s' = 2.357 F

| Lens | Radii | | Thicknesses and Spacings | | N | V |
|---|---|---|---|---|---|---|
| $L_9$ | $R'_9$ | $= -0.713$ | $T_{10}$ | $= 0.177$ | 1.465 | 65.7 |
| | $R_{10}$ | $= -1.551$ | $S_{10}$ | $= CS = 0.106$ | | |
| $L_{10}$ | | | $T_{11}$ | $= 0.510$ | 1.785 | 26.1 |
| | $R'_{10}$ | $= +2.304$ | $S_{11}$ | $= 0.079$ | | |
| | $R_{11}$ | $= -2.604$ | | | | |
| $L_{11}$ | | | $T_{12}$ | $= 0.165$ | 1.465 | 65.7 |
| | $R'_{11}$ | $= -0.824$ | $S_{12}$ | $= 0.004$ | | |
| | $R_{12}$ | $= +13.34$ | | | | |
| $L_{12}$ | | | $T_{13}$ | $= 0.182$ | 1.465 | 65.7 |
| | $R'_{12}$ | $= -1.443$ | | | | |

Lens $L_1$ is the equivalent of group Gr. (d).

In the customary scientific nomenclature, the refractive power of an individual lens surface is defined as $\varphi = (n' - n) : R$ and thus the sum of several successive area refractive powers can be written as $\phi = \varphi + \varphi' + \ldots$, as has been done in the preceding description for the air-lens refractive powers.

Furthermore, the corresponding numerical values for the five examples given in foregoing Tables 1 through 5 are set forth below in Table 6, for each individual feature. It is pointed out by way of explanation that in Example 4 (Table 4) the negative lens which is located in the first position in the rear member and faces the aperture space is developed as two lenses, whereby the particularly advantageous possibility is obtained of making the second one of these two lenses from a material of very low refractive power. The composite surface between the first and second partial lenses which together make up the negative lens $L_{10}$ are designated respectively as $R_V$ and $R'_V$.

In each case we fundamentally have $c_0 = 1 : 2R$. In Example 2, the c-values in detail are:
$c_1 = 1.637834 \times 10^{-1}$
$c_1 = 1.279149 \times 10^{-3}$
$c_3 = 1.687399 \times 10^{-4}$
$c_4 = 2.493060 \times 10^{-5}$ In Example 4, these values are:
$c_1 = 1.045481 \times 10^{-1}$
$c_2 = -3.482251 \times 10^{-3}$
$c_3 = 0$
$c_4 = 0$ The ranges stated in the claims are based on the highest and lowest values given in foregoing Table 6 for each feature, plus or minus a tolerance of 5 per cent, that is 5 percent added to the highest value and 5 percent subtracted from the lowest value for each feature in Table 6. These values originally given in Table 6 and the adjusted tolerance values are given for convenience in the following table.

Table 6

| Feature | Example | | | | |
|---|---|---|---|---|---|
| | 1 | 2 | 3 | 4 | 5 |
| $f_a$ | 1.194 F | 1.345 F | 1.957 F | 1.680 F | 1.929 F |
| $f_b$ | 5.659 F | 7.760 F | 2.561 F | 3.670 F | 3.196 F |
| $f_{c,b}$ | 4.960 F | 5.117 F | 2.529 F | 3.551 F | 2.890 F |
| $-f_d$ | — | — | 7.356 F | 6.245 F | 6.135 F |
| $-\phi\gamma$ | 0.312 Φ | 0.362 Φ | 0.311 Φ | 0.371 Φ | 0.306 Φ |
| $-\phi\delta$ | — | — | 0.320 Φ | 0.153 Φ | 0.179 Φ |

Two of the five examples given in Tables 1 through 5 are provided with an aspherical surface. In Example 2 (Table 2) the rear surface $R'_8$ of the negative lens $L_8$ in the rear member is developed as a deformed surface, and the value of $R'_8$ indicated in Table 2 is the vertex radius of this surface at the location of the optical axis. In Example 4 (Table 4) the rear outer surface $R'_{10}$ of the negative doublet $L_{10}$ is also a deformed surface, and in this case also the numerical value of $R'_{10}$ indicated in Table 4 is the value of the vertex radius of this surface at the location of the optical axis.

These deformed surfaces are generally determined by the shaft height (Pfeilhöhen) equation $$P = c_0 H^2 + c_1 H^4 + c_2 H^6 + c_3 H^8 + c_4 H^{10}$$

Table 7

| Feature | Highest value | +5% | Lowest value | -5% |
|---|---|---|---|---|
| $f_a$ | 1.957 F | 2.055 F | 1.194 F | 1.134 F |
| $f_b$ | 7.760 F | 8.148 F | 2.561 F | 2.433 F |
| $f_{c,b}$ | 5.117 F | 5.373 F | 2.529 F | 2.403 F |
| $-f_d$ | 7.356 F | 7.724 F | 6.135 F | 5.826 F |
| $-\phi\gamma$ | 0.371 Φ | 0.390 Φ | 0.306 Φ | 0.291 Φ |
| $-\phi\delta$ | 0.320 Φ | 0.336 Φ | 0.153 Φ | 0.145 Φ |

What is claimed is:
1. A wide angle lens system with a relatively long back focus on the image side and a relatively large angle of view, comprising a rear member behind an ap- erture space and a front member in front of said aperture space, said rear member comprising at least three lens elements each with air on both sides, the forward element adjacent said aperture space being a negative element followed in a rearward direction by two positive elements, said front member comprising at least three groups of lens elements, each group having a negative component at the front of the group and a positive component rearwardly of such negative component, the negative component and positive component of each group enclosing between them a diverging-acting air space constituting a negative air lens, each of said air lenses having a more strongly diverging glass-air surface which is concave toward an image at the rear of the lens system, the successive groups in order from the aperture space forwardly being respectively designed Gr. (a) and Gr. (b) and Gr. (c), the lens elements being so constructed that:

1. The paraxial focal length ($f_a$) of the rearmost group Gr. (a) of the front member is between the limits of 1.134 times and 2.055 times the equivalent focal length (F) of the entire lens system.
2. The absolute value of the paraxial focal length ($f_b$) of the group Gr. (b) is between the limits of 8.148F and 2.433 F.
3. The numerical value of the paraxial focal length ($f_{c,b}$) of the combination of the two groups Gr. (c) and Gr. (b) has an absolute value between the limits of 2.40 F and 5.373 F.

2. A lens system as defined in claim 1, having in its front member a fourth group Gr. (d) arranged forwardly of Gr. (c), the paraxial focal length ($f_d$) of this group Gr. (d) is, in its negative value, within the limits of 5.826 F and 7.724 F.

3. A lens system as defined in claim 2, wherein said fourth group Gr. (d) consists of only a single lens element which element is negative and which acts as the equivalent of a group having both a negative and a positive element, the air lens of said fourth group Gr. (d) being formed between the rear surface of said single element and the front surface of the negative component at the front of the next succeeding group Gr. (c) behind said fourth group Gr. (d).

4. A lens system as defined in claim 2, wherein the air lens refractive power ($\phi_\delta$) of the air lens ($\delta$) of the fourth group Gr. (d) is, in its negative value, within the limits of 0.145 $\Phi$ and 0.336 $\Phi$, in which $\Phi$ is the equivalent refractive power of the entire lens system, being 1/F.

5. A lens system as defined in claim 4, characterized by the fact that said fourth group Gr. (d) does not include any positive lens element, and that the air lens ($\delta$) of the fourth group is formed between a meniscus shaped negative lens of the fourth group and the front lens of the third group Gr. (c).

6. A lens system as defined in claim 1, wherein the air lens refractive power ($\phi_\gamma$) as the sum of the surface refractive powers of the two radii of curvature enclosing the air lens $\gamma$ in the group Gr. (c) is so dimensioned that the negative value of $\phi\gamma$ is within the limits of 0.291 $\Phi$ and 0.390 $\Phi$, in which $\Phi$ is the equivalent refractive power of the entire lens system, being 1/F.

7. A lens sytem as defined in claim 1, characterized by he fact that a lens component in the vicinity of said aperture space is divided into two lens elements with a finite air space between them, and a filter is interposed in said air space.

8. A lens system as defined in claim 7, wherein said divided component is the component next in front of said aperture space, being the rearmost component of the rearmost group Gr. (a) of the front member (Vgl of the lens system.

9. A lens system as defined in claim 1, wherein the characteristics of the lens elements and their spatial relationship to each other are substantially in the proportions indicated by the data in the following table:

| Lens | Radii | | Thicknesses and Spacings | | N | V |
|---|---|---|---|---|---|---|
| $L_1$ | $R_1$ | = +2.249 | $T_1$ | = 0.105 | 1.691 | 54.7 |
|  | $R'_1$ | = +1.127 |  |  |  |  |
| $L_2$ | $R_2$ | = +2.382 | $T_2$ | = 0.263 | 1.717 | 29.5 |
|  | $R'_2$ | = +16.50 |  |  |  |  |
|  |  |  | $S_2$ | = 0.005 |  |  |
| $L_3$ | $R_3$ | = +1.536 | $T_3$ | = 0.060 | 1.713 | 53.8 |
|  | $R'_3$ | = +0.706 |  |  |  |  |
|  |  |  | $S_3$ | = 0.362 |  |  |
| $L_4$ | $R_4$ | = −5.772 | $T_4$ | = 0.574 | 1.669 | 45.0 |
|  | $R'_4$ | = −0.864 |  |  |  |  |
|  |  |  | $S_4$ | = 0 |  |  |
| $L_5$ | $R_5$ | = −0.864 | $T_5$ | = 0.126 | 1.805 | 25.4 |
|  | $R'_5$ | = −1.662 |  |  |  |  |
|  |  |  | $S_5$ | = 0.007 |  |  |
| $L_6$ | $R_6$ | = +1.409 | $T_6$ | = 0.059 | 1.713 | 53.8 |
|  | $R'_6$ | = +0.462 |  |  |  |  |
|  |  |  | $S_6$ | = 0.077 |  |  |
| $L_7$ | $R_7$ | = +0.743 | $T_7$ | = 0.589 | 1.622 | 36.00 |
|  | $R'_7$ | = −0.716 |  |  |  |  |
|  |  |  | $S_7$ | = CS = 0.148 |  |  |
| $L_8$ | $R_8$ | = −0.815 | $T_8$ | = 0.144 | 1.805 | 25.4 |
|  | $R'_8$ | = +2.635 |  |  |  |  |
|  |  |  | $S_8$ | = 0.059 |  |  |
| $L_9$ | $R_9$ | = −1.482 | $T_9$ | = 0.134 | 1.504 | 67.0 |
|  | $R'_9$ | = −0.545 |  |  |  |  |
|  |  |  | $S_9$ | = 0.003 |  |  |
| $L_{10}$ | $R_{10}$ | = −3.803 | $T_{10}$ | = 0.107 | 1.603 | 60.5 |
|  | $R'_{10}$ | = −1.064 |  |  |  |  | wherein all linear dimensions of radii, thicknesses, and spacings are expressed in proportion to the equivalent focal length of the entire lens sytem, which is considered as unity, and the reference letters and numerals have the respective meanings explained in the foregoing specification.

10. A lens system as defined in claim 1, wherein the characteristics of the lens elements and their spatial relationship to each other are substantially in the proportions indicated by the data in the following table:

| Lens | Radii | | Thicknesses and Spacings | | N | V |
|---|---|---|---|---|---|---|
| $L_1$ | $R_1$ | = +2.7549 | $T_1$ | = 0.1224 | 1.6910 | 54.71 |
| | $R'_1$ | = +1.1710 | $S_1$ | = 0.5516 | | |
| $L_2$ | $R_2$ | = +3.5320 | $T_2$ | = 0.2765 | 1.8052 | 25.43 |
| | $R'_2$ | = −317.02 | $S_2$ | = 0.0030 | | |
| $L_3$ | $R_3$ | = +2.4620 | $T_3$ | = 0.0744 | 1.7130 | 53.85 |
| | $R'_3$ | = +0.8898 | $S_3$ | = 0.4677 | | |
| $L_4$ | $R_4$ | = −5.0772 | $T_4$ | = 0.8062 | 1.7130 | 53.85 |
| | $R'_4$ | = −0.8937 | $S_4$ | = 0 | | |
| $L_5$ | $R_5$ | = −0.8937 | $T_5$ | = 0.0656 | 1.5731 | 42.58 |
| | $R'_5$ | = −2.9405 | $S_5$ | = 0.1064 | | |
| $L_6$ | $R_6$ | = +1.0377 | $T_6$ | = 0.0546 | 1.6910 | 54.71 |
| | $R'_6$ | = +0.6213 | $S_6$ | = 0.2085 | | |
| $L_7$ | $R_7$ | = +0.9028 | $T_7$ | − 0.6039 | 1.5481 | 45.75 |
| | $R'_7$ | = −1.033 | $S_7$ | = CS = 0.1531 | | |
| $L_8$ | $R_8$ | = −1.0857 | $T_8$ | = 0.4305 | 1.7847 | 26.08 |
| | $R'_8$ | = +3.6924 | $S_8$ | = 0.0591 | | |
| $L_9$ | $R_9$ | = −2.2744 | $T_9$ | = 0.1046 | 1.5038 | 66.99 |
| | $R'_9$ | = −0.8466 | $S_9$ | = 0.0027 | | |
| $L_{10}$ | $R_{10}$ | = −2.6585 | $T_{10}$ | = 0.1112 | 1.6127 | 58.58 |
| | $R'_{10}$ | = −1.0537 | | | | | wherein all linear dimensions of radii, thicknesses, and spacings are expressed in proportion to the euqivalent focal length of the entire lens system, which is considered as unity, and the reference letters and numerals have the respective meanings explained in the foregoing specification.

11. A lens system as defined in claim 1, wherein the characteristics of the lens elements and their spatial relationship to each other are substantially in the proportions indicated by the data in the following table:

| Lens | Radii | | Thicknesses and Spacings | | N | V |
|---|---|---|---|---|---|---|
| $L_1$ | $R_1$ | = +4.713 | $T_1$ | = 0.160 | 1.623 | 58.1 |
| | $R'_1$ | = +1.794 | $S_1$ | = 0.948 | | |
| $L_2$ | $R_2$ | = +22.89 | $T_2$ | = 0.345 | 1.623 | 58.1 |
| | $R'_2$ | = −18.05 | $S_2$ | = 0.006 | | |
| $L_3$ | $R_3$ | = +4.793 | $T_3$ | = 0.130 | 1.691 | 54.7 |
| | $R'_3$ | = +1.822 | $S_3$ | = 0.545 | | |
| $L_4$ | $R_4$ | = +11.46 | $T_4$ | = 0.321 | 1.785 | 26.1 |
| | $R'_4$ | = −14.25 | $S_4$ | = 0.003 | | |
| $L_5$ | $R_5$ | = +2.823 | $T_5$ | = 0.123 | 1.713 | 53.9 |
| | $R'_5$ | = +1.378 | $S_5$ | = 0.462 | | |
| $L_6$ | $R_6$ | = +2.172 | $T_6$ | = 0.922 | 1.713 | 53.9 |
| | $R'_6$ | = −1.586 | $S_6$ | = 0 | | |
| $L_7$ | $R_7$ | = −1.586 | $T_7$ | = 0.215 | 1.564 | 43.8 |
| | $R'_7$ | = −3.060 | $S_7$ | = 0.003 | | |
| | $R_8$ | = +1.675 | | | | |

—Continued

| Lens | Radii | | Thicknesses and Spacings | | N | V |
|---|---|---|---|---|---|---|
| $L_8$ | $R'_8$ | = +0.504 | $T_8$ | = 0.051 | 1.788 | 47.4 |
|  |  |  | $S_8$ | = 0.227 |  |  |
| $L_9$ | $R_9$ | = +1.696 | $T_9$ | = 0.379 | 1.785 | 26.1 |
|  | $R'_9$ | = −7.290 | $S_9$ | = 0.056 |  |  |
|  |  | plane | $T_{10}$ | = 0.052 Filter | 1.522 | 59.5 |
|  |  | plane | $S_{10}$ | = 0.054 |  |  |
| $L_{10}$ | $R_{10}$ | = −8.173 | $T_{11}$ | = 0.184 | 1.465 | 65.7 |
|  | $R'_{10}$ | = −0.707 | $S_{11}$ | = CS = 0.112 |  |  |
| $L_{11}$ | $R_{11}$ | = −1.383 | $T_{12}$ | = 0.513 | 1.785 | 26.1 |
|  | $R'_{11}$ | = +2.378 | $S_{12}$ | = 0.072 |  |  |
| $L_{12}$ | $R_{12}$ | = −2.685 | $T_{13}$ | = 0.158 | 1.465 | 65.7 |
|  | $R'_{12}$ | = −0.835 | $S_{13}$ | = 0.004 |  |  |
| $L_{13}$ | $R_{13}$ | = +22.61 | $T_{14}$ | = 0.178 | 1.465 | 65.7 |
|  | $R'_{13}$ | = −1.303 |  |  |  |  | wherein all linear dimensions of radii, thicknesses, and spacings are expressed in proportion to the equivalent focal length of the entire lens system, which is considered as unity, and the reference letters and numerals have the respective meaning explained in the foregoing specification.

12. A lens system as defined in claim 1, wherein the characteristics of the lens elements and their spatial relationship to each other are substantially in the proportions indicated by the data in the following table: wherein all linear dimensions of radii, thicknesses, and spacings are expressed in proportion to the equivalent

| Lens | Radii | | Thicknesses and Spacings | | N | V |
|---|---|---|---|---|---|---|
| $L_1$ | $R_1$ | = +3.222 | $T_1$ | = 0.188 | 1.623 | 58.1 |
|  | $R'_1$ | = +1.723 | $S_1$ | = 0.788 |  |  |
| $L_2$ | $R_2$ | = +3.316 | $T_2$ | = 0.122 | 1.691 | 54.7 |
|  | $R'_2$ | = +1.592 | $S$ | = 0.706 |  |  |
| $L_3$ | $R_3$ | = +12.37 | $T_3$ | = 0.311 | 1.785 | 26.1 |
|  | $R'_3$ | = −10.26 | $S_3$ | = 0.061 |  |  |
| $L_4$ | $R_4$ | = +2.505 | $T_4$ | = 0.093 | 1.713 | 53.9 |
|  | $R'_4$ | = +1.320 | $S_4$ | = 0.502 |  |  |
| $L_5$ | $R_5$ | = +3.437 | $T_5$ | = 0.751 | 1.713 | 53.9 |
|  | $R'_5$ | = −1.320 | $S_5$ | = 0 |  |  |
| $L_6$ | $R_6$ | = −1.320 | $T_6$ | = 0.263 | 1.548 | 45.8 |
|  | $R'_6$ | = −3.998 | $S_6$ | = 0.007 |  |  |
| $L_7$ | $R_7$ | = +1.349 | $T_7$ | = 0.047 | 1.788 | 47.4 |
|  | $R'_7$ | = +0.507 | $S_7$ | = 0.231 |  |  |
| $L_8$ | $R_8$ | = +1.760 | $T_8$ | = 0.383 | 1.785 | 26.1 |
|  | $R'_8$ | = −6.958 | $S_8$ | = 0.056 |  |  |
|  |  | plane | $T_9$ | = 0.052 filter | 1.522 | 59.5 |
|  |  | plane | $S_9$ | = 0.043 |  |  |
| $L_9$ | $R_9$ | = −16.74 | $T_{10}$ | = 0.176 | 1.465 | 65.7 |
|  | $R'_9$ | = −0.706 | $S_{10}$ | = CS = 0.115 |  |  |
| $L_{10}$ | $R_{10}$ | = −1.339 | $T_{11}$ | = 0.469 | 1.785 | 26.1 |
|  | $R_V$ | = −2.469 | $S_{11}$ | = 0 |  |  |
|  | $R'_V$ | = +2.469 | $T_{12}$ | = 0.001 | 1.510 | 59.0 |
|  | $R'_{10}$ | = +2.701 | $S_{12}$ | = 0.068 |  |  |
| $L_{11}$ | $R_{11}$ | = −3.487 | $T_{13}$ | = 0.142 | 1.465 | 65.7 |
|  | $R'_{11}$ | = −0.870 | $S_{13}$ | = 0.003 |  |  |
| $L_{12}$ | $R_{12}$ | = −4.205 | $T_{14}$ | = 0.165 | 1.465 | 65.7 |
|  | $R'_{12}$ | = −1.049 |  |  |  |  | focal length of the entire lens system, which is considered as unity, and the reference letters and numerals have the respective meaning explained in the foregoing specification.

13. A lens system as defined in claim 1, wherein the characteristics of the lens elements and their spatial relationship to each other are substantially in the proportions indicated by the data in the following table:

wherein all linear dimensions of radii, thicknesses, and spacings are expressed in proportion to the equivalent focal length of the entire lens system, which is considered as unity, and the reference letters and numerals have the respective meanings explained in the foregoing specification.

| Lens | Radii | | Thicknesses and Spacings | | N | V |
|---|---|---|---|---|---|---|
| $L_1$ | $R_1$ | = +3.472 | $T_1$ | = 0.205 | 1.623 | 58.1 |
| | $R'_1$ | = +1.778 | $S_1$ | = 0.932 | | |
| $L_2$ | $R_2$ | = +4.039 | $T_2$ | = 0.139 | 1.691 | 54.7 |
| | $R'_2$ | = +1.804 | $S_2$ | = 0.656 | | |
| $L_3$ | $R_3$ | = +10.15 | $T_3$ | = 0.342 | 1.785 | 26.1 |
| | $R'_3$ | = −9.043 | $S_3$ | = 0.008 | | |
| $L_4$ | $R_4$ | = +2.859 | $T_4$ | = 0.168 | 1.713 | 53.9 |
| | $R'_4$ | = +1.277 | $S_4$ | = 0.457 | | |
| $L_5$ | $R_5$ | = +2.423 | $T_5$ | = 0.915 | 1.713 | 53.9 |
| | $R'_5$ | = −1.324 | $S_5$ | = 0 | | |
| $L_6$ | $R_6$ | = −1.324 | $T_6$ | = 0.223 | 1.564 | 43.8 |
| | $R'_6$ | = −3.813 | $S_6$ | = 0.004 | | |
| $L_7$ | $R_7$ | = +1.740 | $T_7$ | = 0.048 | 1.788 | 47.4 |
| | $R'_7$ | = +0.501 | $S_7$ | = 0.223 | | |
| $L_8$ | $R_8$ | = +1.715 | $T_8$ | = 0.368 | 1.785 | 26.1 |
| | $R'_8$ | = −8.660 | $S_8$ | = 0.049 | | |
| | | plane | $T_9$ | = 0.053 filter | 1.522 | 59.5 |
| | | plane | $S_9$ | = 0.047 | | |
| $L_9$ | $R_9$ | = −58.72 | $T_{10}$ | = 0.177 | 1.465 | 65.7 |
| | $R'_9$ | = −0.713 | $S_{10}$ | = CS = 0.106 | | |
| $L_{10}$ | $R_{10}$ | = −1.551 | $T_{11}$ | = 0.510 | 1.785 | 26.1 |
| | $R'_{10}$ | = +2.304 | $S_{11}$ | = 0.079 | | |
| $L_{11}$ | $R_{11}$ | = −2.604 | $T_{12}$ | = 0.165 | 1.465 | 65.7 |
| | $R'_{11}$ | = −0.824 | $S_{12}$ | = 0.004 | | |
| $L_{12}$ | $R_{12}$ | = +13.34 | $T_{13}$ | = 0.182 | 1.465 | 65.7 |
| | $R'_{12}$ | = −1.443 | | | | |

\* \* \* \* \*